United States Patent [19]
Sills

[11] 3,724,018
[45] Apr. 3, 1973

[54] SWAB WITH FOAM PLASTIC WIPING TIP

[76] Inventor: Albert J. Sills, 117 Adams, Apt. No. 2, Glendale, Calif. 91205

[22] Filed: Aug. 4, 1971

[21] Appl. No.: 169,110

Related U.S. Application Data

[63] Continuation of Ser. No. 850,311, July 30, 1969, abandoned, which is a continuation-in-part of Ser. No. 749,064, July 31, 1968, abandoned.

[52] U.S. Cl. .............................................15/244 R
[51] Int. Cl. .............................................A47l 13/46
[58] Field of Search......15/104.93, 104.94, 118, 209, 15/225, 226, 244

[56] References Cited

UNITED STATES PATENTS

| | | | |
|---|---|---|---|
| 982,232 | 1/1911 | Bartholomew | 128/269 |
| 1,866,862 | 7/1932 | Prestwich et al. | 15/225 X |
| 2,871,497 | 2/1959 | Miller et al. | 15/244 R |
| 3,075,222 | 1/1963 | Miller | 15/209 |
| 3,171,820 | 3/1965 | Volz | 15/244 B X |
| 3,228,398 | 1/1966 | Leonard et al. | 128/269 |
| 3,281,884 | 11/1966 | Feil | 15/226 |
| 3,377,643 | 4/1968 | Teng et al. | 15/118 |

FOREIGN PATENTS OR APPLICATIONS

| | | | |
|---|---|---|---|
| 291,675 | 6/1928 | Great Britain | 15/244 R |
| 811,756 | 4/1959 | Great Britain | 128/269 |

*Primary Examiner*—Daniel Blum
*Attorney*—Boniard I. Brown

[57] ABSTRACT

A swab having a reticulated plastic foam wiping tip formed by wrapping a foam strip in a unique way about one end of a handle. The wiping tip is characterized by a multiplicity of interconnecting cellular pores which enter the external surfaces and extend throughout the interior of the tip, whereby the swab is effective to remove foreign material from a surface by moving the tip across the surface in such a way that the material enters and becomes entrapped within the pores of the tip and to apply to a surface material contained within the pores by moving the tip across the surface while pressing the tip against the surface.

1 Claim, 9 Drawing Figures

PATENTED APR 3 1973 3,724,018

INVENTOR
ALBERT J. SILLS
BY
Boniard I. Brown
ATTORNEY

PATENTED APR 3 1973 3,724,018
SHEET 2 OF 2
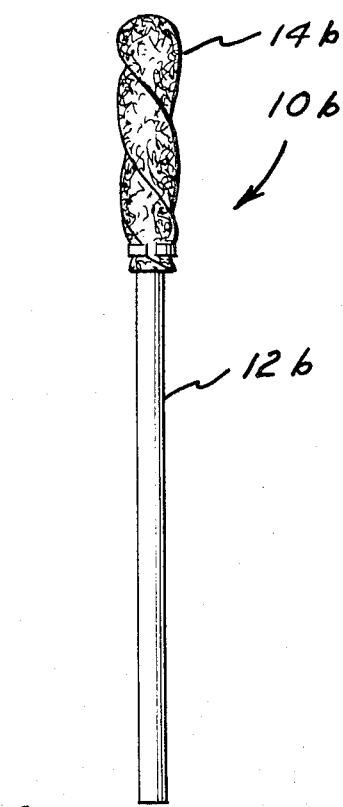
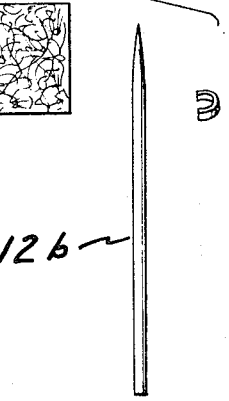
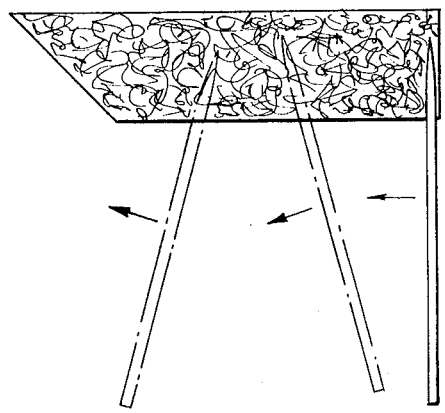
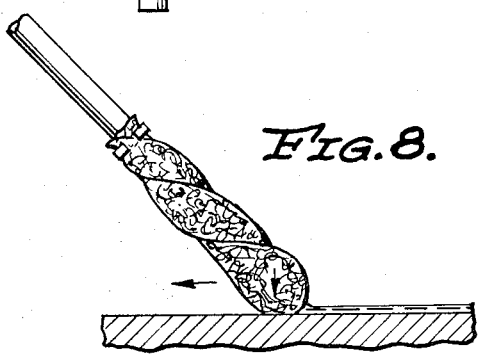
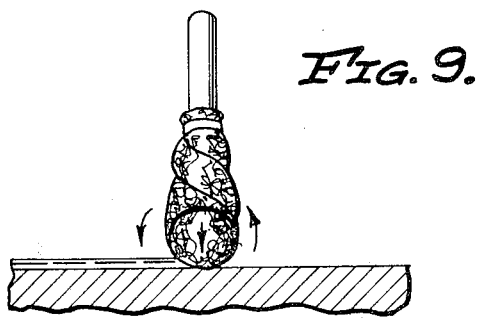
INVENTOR
ALBERT J. SILLS
BY
Bernard I. Brown
ATTORNEY

SWAB WITH FOAM PLASTIC WIPING TIP

This application is a continuation of application Ser. No. 850,311 filed July 30, 1969, which is a continuation-in-part of application Ser. No. 749,064, filed July 31, 1968, entitled "Swab With Foam Plastic Wiping Tip," both now abandoned.

BACKGROUND OF THE INVENTION

1. Field of the Invention

This invention relates generally to swabs and more particularly to an improved swab having a reticulated plastic foam wiping tip.

2. Prior Art

Many different types of swabs have been devised for a variety of purposes. The present invention is concerned primarily with swabs of the class which are used for removing foreign material from surfaces, particularly particles from surfaces which are prone to scratching or other damage by surface wiping techniques which effectively slide the particles across the surface, and for applying materials, such as liquids, pastes, and the like, to surfaces. It is well recognized by those versed in the art that many of the existing swabs of the class described are deficient in that when they are wiped across a surface, they tend to merely drag particles on the surface across the latter, thereby scratching the surface. This is due to the fact that the wiping tip of such swabs is constructed of a non-reticulated or closed pore material. The particles on the surface being wiped tend to lodge or become entrapped on the surface of the wiping tip. As a consequence, when the tip is wiped across the surface to be cleaned, the tip merely drags the particles across the surface. When used as an applicator, the existing swabs are unsatisfactory for many applications because of the relatively large size and construction of the wiping tip and for various other reasons. The existing swabs, for example, are ill suited to applying materials to small areas, such as touching up paintings, applying makeup, and so on.

SUMMARY OF THE INVENTION

The present invention provides an improved swab of the general class described which avoids the above noted and other disadvantages of the existing swabs of this class. The present swab has a handle to one end of which is secured a wiping tip composed of a reticulated foam plastic material, such as polyurethane foam. A primary feature of the invention is concerned with a method of forming the tip by wrapping a strip of foam plastic about the handle in a unique manner and then fixing the strip in position. This wiping tip is characterized by a multiplicity of interconnecting cellular pores which enter the outer surfaces of the tip and extend throughout the interior of the tip. Foam plastic material suitable for the wiping tip may be obtained in a variety of pore sizes suitable for different wiping applications. An advantage of the present swab resides in the fact that when the swab is wiped across a surface to be cleaned, particles on the surface enter and become entrapped within the open pores of the wiping tip. As a consequence, the particles are removed from contact with the surface and are thus prevented from scratching the surface. Moreover, after use, the wiping tip may be readily cleaned by directing water or other cleansing fluid through its pores to flush foreign matter from the pores. The swab may also be used as an applicator by filling its pores with the material to be applied and wiping the swab across a surface while the swab is pressed against the surface to squeeze the material from the pores. In this regard, an important feature of the swab is the small size of its tip which adapts the swab to precision small scale applications.

Another distinct advantage of the present foam plastic swab is that it is not prone to degredation. As a result, bits and pieces of the swab wiping tip do not tend to remain on the surface being wiped.

BRIEF DESCRIPTION OF THE DRAWINGS

FIG. 5 illustrates a preferred further modified swab;

FIG. 6 is an exploded view of the swab of FIG. 5;

FIG. 7 illustrates the method of wrapping the swab tip of FIG. 5;

FIG. 8 illustrates the swab of FIG. 5 used as an applicator; and

FIG. 9 illustrates the swab of FIG. 5 used as a cleaner.

DESCRIPTION OF THE PREFERRED EMBODIMENTS

Figure 1:
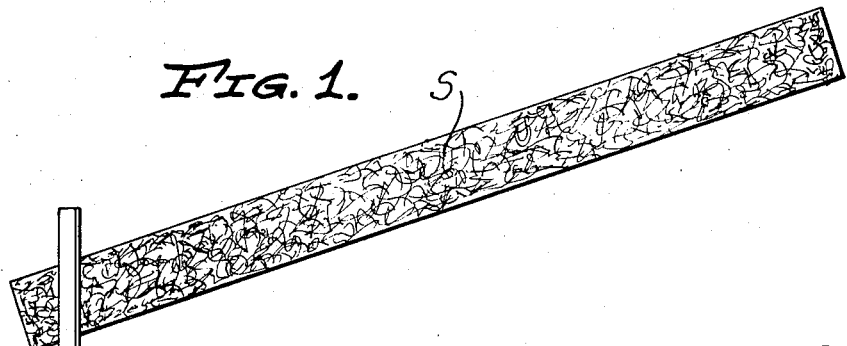
FIG. 1 illustrates a present swab in the course of its fabrication.
Figure 2:
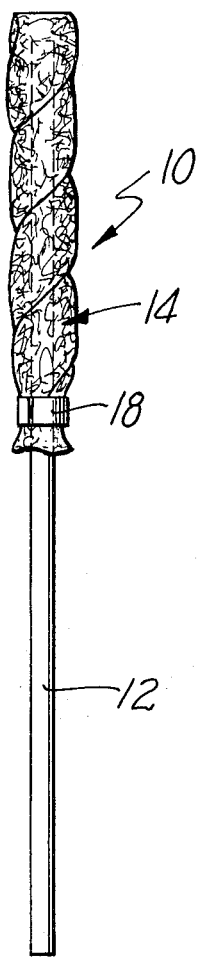
FIG. 2 illustrates the completed swab.
Figure 3:
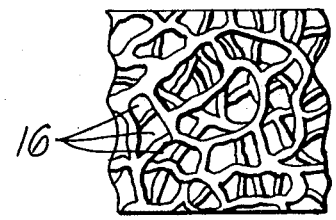
FIG. 3 is an enlargement of a portion of the surface of the swab wiping tip, illustrating the reticulated or open pore construction of the tip.

Turning now to these drawings, and particularly to FIGS. 1 through 3, there is illustrated a swab 10 according to the invention. This swab has a stick-like handle 12 and a wiping tip 14 secured to one end of the handle. According to a primary feature of the invention, the wiping tip 14 is constructed of a reticulated plastic foam material, such as polyurethane foam. Plastic foam materials of this type are characterized by a multiplicity of interconnecting cellular pores 16 which enter the external surfaces and extend throughout the interior of the material. This reticulated or open pore construction of the wiping tip 14 presents a unique advantage. Thus, when the tip is wiped across a surface to be cleaned, particulate matter and other foreign material on the surface, such as dust, grit, and the like, enters and becomes entrapped within the pores 16 of the tip. As a consequence, such foreign material, and particularly particulate matter, is removed from contact with the surface being cleaned and thus does not tend to scratch the surface as the wiping tip moves across the surface. Moreover, the wiping tip 14 can be easily cleaned by directing clean water or other cleansing fluid through the pores of the tip to flush foreign matter from the pores.

The foam plastic tip 14 of the present swab 10 may be applied in various ways to the end of the handle 12. In FIGS. 1 and 2, for example, the tip 14 is provided by selecting a long narrow strip S of plastic foam material and wrapping the strip spirally about the handle 12. The strip is then secured to the handle in any convenient way, as by means of a metal band 18, or the like, which is crimped about the tip in the manner illustrated. In this regard, it should be noted that in most applications of the present swab, it will be necessary to secure the foam plastic tip 14 to the handle 12 by means of a metal clip or other similar fastening means, rather than with glue or the like. This is due to the fact that swabs of this type are commonly cleansed or used in connection with alcohol and other liquids in which most glues are soluble.

Figure 4:
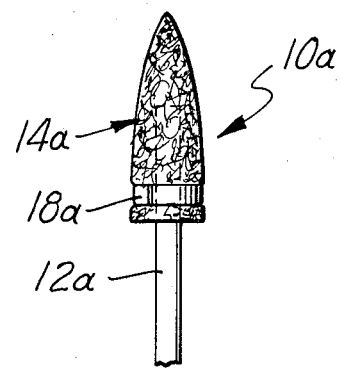
FIG. 4 illustrates a modified swab

Attention is now directed to FIG. 4 illustrating a modified swab 10a. In this case, the wiping tip 14a of the swab comprises a molded foam plastic body having a central opening for receiving the handle 12a of the swab. As before, the tip may be secured to the handle in any convenient way, as by means of a metal clip 18a.

The preferred modified swab 10b of FIGS. 5 through 7 has a handle 12b and a wiping tip 14b fashioned from a strip Sb of plastic foam material. Strip Sb has a flat end and an opposite tapered end. The strip is wound, flat end first, on the handle 12b in such a way as to provide a rounded end on the resulting wiping tip, as shown in FIG. 5. This is accomplished by changing the angle of the handle relative to the strip during the winding operation, as depicted in FIG. 7, in such a way that successive turns of the strip cross one another in overlapping relation to form a bulbular mass about and fully enclosing the end of the handle. The tapered end of the strip is wound last so that this end is located at the inner or lower end of the wiping tip. A metal band 18b is then fastened about the tip in such a way that the band overlaps the tapered end of the foam strip Sb to secure the wiping tip 14b firmly to the handle.

FIGS. 8 and 9 illustrate two different ways of using the present swab. In FIG. 8, the swab is being used as an applicator for applying a substance to a surface. In this case, the pores in the wiping tip of the swab are filled with the substance to be applied by dipping the tip in a body of the substance. The wiping tip is then pressed against the surface to squeeze the substance from the pores in the tip, thereby to dispense the substance onto the work surface. If desired, the wiping tip may be moved across the surface concurrently with pressure of the tip against the surface, as illustrated in FIG. 8, to apply a stripe of the substance to the surface. FIG. 9 illustrates the swab being used to remove a substance from a surface. In this case, the wiping tip of the swab is moved across the surface in such a way that the substance enters and remains within the pores in the wiping tip. During the wiping operation, the swab may be rotated about the axis of its handle, as illustrated in FIG. 9, to continuously expose a fresh portion of the wiping tip to the surface being cleaned.

The swab of FIGS. 5 through 7 may be used for various purposes including those already discussed. One particularly important use of the swab is an applicator for applying liquid or paste substances to relatively small surface areas. In this regard, it will be recognized that the foam material of the wiping tip is particularly important since its pores are capable of containing a substantial quantity of the substance to be applied.

Among the substances which may be applied with the present swab are oil, paste, cosmetics such as eye liner, liquid or cream dots, lip makeup, paint, and so on. The pores of the wiping tip retain the substance within the tip until the latter is pressed against the work surface. The amount of substance dispensed to the surface may be accurately controlled by regulating the pressure of the wiping tip against the surface. While the swab is particularly suited for use as an applicator, it also may be used to remove substances from the surface in the manner illustrated in FIG. 9. In this regard, it will be evident that when the wiping tip is rotated during the wiping operation, as illustrated in the drawings, the pores in the tip are squeezed or constricted within the region of contact of the tip with the surface. As the pores are rotated from this region of contact, they reexpand to create within the pores a partial vacuum which tends to suck material from the work surface into the pores. This feature of the wiping tip uniquely adapts the present swab for use in removing liquids from surfaces.

The present swab may be made in various sizes suitable for different uses. For example, a swab intended for miniature painting applications will be made relatively small and may have a work engaging tip which is on the order of one-tenth inch in diameter. Swabs intended for other applications, such as medicinal applicators, may be made larger in diameter.

While the invention has been described in connection with certain of its presently preferred embodiments, it will be immediately evident to those versed in the art that various modifications of the invention are possible within the spirit and scope of the following claim.

I claim:
1. A swab comprising:
   a stick-like handle,
   an elastic foam plastic strip applied to said handle by winding said strip about said handle while periodically changing the angle of said handle relative to said strip in such a way as to form a bulbular end on said wiping tip completely enclosing the end of said handle, means securing the strip on the handle and
   said strip comprising a single layer reticulated plastic foam material having bare side surfaces and characterized by a multiplicity of interconnecting cellular pores which enter the outer surface and extend throughout the interior of and open through the inner surface of the strip, whereby said strip is stretched endwise to enlarge said pores during application of the strip to said handle, such that said tip is effective to remove particulate matter and other foreign material from a surface being wiped by entrapment of such material within the enlarged pores of said wiping tip.

* * * * *